United States Patent
Mildner et al.

(10) Patent No.: US 9,701,274 B2
(45) Date of Patent: Jul. 11, 2017

(54) HOOD FOR A MOTOR VEHICLE BODY

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/919,274

(22) Filed: Oct. 21, 2015

(65) Prior Publication Data

US 2016/0107606 A1    Apr. 21, 2016

(30) Foreign Application Priority Data

Oct. 21, 2014   (DE) .................. 10 2014 015 536

(51) Int. Cl.
| | | |
|---|---|---|
| B60N 99/00 | (2006.01) | |
| B60R 21/34 | (2011.01) | |
| B62D 25/12 | (2006.01) | |

(52) U.S. Cl.
CPC .............. *B60R 21/34* (2013.01); *B62D 25/12* (2013.01); *B60R 2021/343* (2013.01)

(58) Field of Classification Search
CPC .... B60R 21/34; B60R 2021/343; B62D 25/12
See application file for complete search history.

(56) References Cited

U.S. PATENT DOCUMENTS

| | | | | |
|---|---|---|---|---|
| 5,115,878 A | * | 5/1992 | Hayata | B60R 21/00 180/69.21 |
| 5,124,191 A | * | 6/1992 | Seksaria | B32B 3/28 180/69.2 |
| 6,883,627 B1 | | 4/2005 | Staines et al. | |
| 7,150,496 B2 | | 12/2006 | Fujimoto | |
| 7,467,680 B2 | * | 12/2008 | Mason | B60R 21/34 180/69.2 |
| 7,578,548 B2 | | 8/2009 | Behr et al. | |
| 2012/0211297 A1 | * | 8/2012 | Ralston | B60R 21/34 180/274 |

FOREIGN PATENT DOCUMENTS

| | | |
|---|---|---|
| DE | 4019121 A1 | 1/1991 |
| DE | 102004061303 A1 | 8/2005 |
| EP | 0992418 A2 | 4/2000 |
| EP | 1228947 A2 | 8/2002 |
| FR | 2621677 A1 | 4/1989 |

(Continued)

OTHER PUBLICATIONS

German Patent Office, German Search Report for German Application No. 102014015536.6, dated Apr. 1, 2015.

(Continued)

*Primary Examiner* — Lori L Lyjak
(74) *Attorney, Agent, or Firm* — Lorenz & Kopf LLP

(57) ABSTRACT

A hood, for example a front hood, for a motor vehicle body is described. The hood includes an outer skin and a stiffening structure covered by the outer skin. The stiffening structure includes a nub plate with a substrate and nubs extending from the substrate under the outer skin made of plastic. A second plate is includes on which apexes of the nubs are fastened.

15 Claims, 5 Drawing Sheets

(56) References Cited

FOREIGN PATENT DOCUMENTS

| JP | 2000168622 A | 6/2000 |
|----|--------------|--------|
| JP | 2003191865 A | 7/2003 |
| JP | 2003226264 A | 8/2003 |
| JP | 2003252246 A | 9/2003 |
| JP | 2003261070 A | 9/2003 |
| RU | 2149114 C1   | 5/2000 |
| WO | 0035612 A2   | 6/2000 |
| WO | 2006048239 A1 | 5/2006 |

OTHER PUBLICATIONS

Great Britain Patent Office, Great Britain Search Report for Great Britain Application No. 1515627.6, dated Dec. 17, 2015.

* cited by examiner

HOOD FOR A MOTOR VEHICLE BODY

CROSS-REFERENCE TO RELATED APPLICATION

This application claims priority to German Patent Application No. 102014015536.6, filed Oct. 21, 2014, which is incorporated herein by reference in its entirety.

TECHNICAL FIELD

The present disclosure pertains to a hood, in particular a front hood, for a motor vehicle body.

BACKGROUND

DE 10 2004 053 248 A1 discloses a hood with an outer skin and a stiffening structure covered by the outer skin. The stiffening structure includes a frame that is deep-drawn from flat material and a plate mounted in an opening of the frame. Nubs are recessed into the plate each of which receives a foam material body, in order to offer support for the foam material arranged between this plate and the outer skin.

On one hand, a body hood should on the one hand be sturdy enough with least possible weight in order to absorb slight impacts during usage without damage. On the other hand, the legal regulations regarding pedestrian protection, however, result in stringent requirements regarding the deformation behavior of the hood, by way of which a pedestrian impacting on the hood is to be protected from striking through non-deformable parts of the vehicle located under the hood because of the impact. These requirements are difficult to fulfill in particular in the case of small cars, wherein the distance between the hood and the non-deformable parts locating below is particularly small. Weight reduction is achievable in that parts which are conventionally produced from steel are replaced by corresponding parts made of aluminum or plastic, but such replacement generally also results in increased resilience. When consequently the hood is already damaged in the case of mild impacts, this brings high maintenance costs with it for the user. If the increased resilience by contrast results in that in the case of a pedestrian accident the head of the pedestrian strikes through onto non-deformable body parts, this excludes the vehicle concerned being approved for road use.

SUMMARY

The present disclosure provides a hood for a motor vehicle, which with low weight allows compliance to the provisions regarding pedestrian protection, in particular to the limit value of the HIC (head impact criterion). According to a configuration of the present disclosure, a hood for a motor vehicle includes an outer skin and a stiffening structure covered by the outer skin. The stiffening structure includes a nub plate with a substrate and nubs deflected out of the substrate, which extends under the outer skin, and includes a second plate, on which apexes of the nubs are fastened. This hood structure makes possible in particular using a light-weight outer skin made of plastic.

Depending on which of the two plates is located outside, either the substrate of the nub plate or the second plate is subjected to tensile load in the event of an impact on the top side of the hood top as a consequence of the fixed connection between nubs and second plate. Since the tensile load capacity of the plates is high, a thin wall thickness and accordingly low weight of the stiffening structure is sufficient for putting up considerable resistance to a deformation of the hood which allows an impacting head to continuously decelerate and prevent striking-through onto non-deformable vehicle parts. Since in this case the stiffness of the outer skin is not critical, the same can consist of a readily-deformable plastic. The easy deformability of such enable the hood to return to its original shape when after a slight collision the deforming force has receded without traces of the deformation remaining visible on the outer skin.

The deformation resistance of the stiffening structure can still be considerably increased when the second plate is likewise a nub plate. The nubs of which in each case engage into intermediate spaces between the nubs of the first nub plate. The stiffening effect in this case is based on the fact that when the stiffening structure is bent through the nubs of one of the two plates move towards one another. When, in the process, they jam the nubs of the respective other nub plate engaging between them, this substantially contributes to the stiffness of the stiffening structure and thus to the load capacity of the hood.

Particularly effective is the stiffening when the nubs have a polygonal cross section with multiple side walls, wherein adjacent nubs of a nub plate include side walls which are aligned with one another and a gap between these side walls that are aligned with one another are filled out by at least one side wall of a nub of the other nub plate. Accordingly, the side walls of the nubs alternating with one another form supporting ribs which extend between the substrates of the two nub plates crosswise and transversely over the stiffening structure. The stiffening structure can furthermore include a frame extending along the edges of the outer skin. Preferentially, the nub plates fill out an opening of this frame. Edges of at least one of the nub plates can be supported on the frame in order to introduce the pressure of an impact, which occurs at a distance from the frame on the outer skin of the hood, into the frame.

A high torsional stiffness of the frame can be achieved when the same is joined from tube elements. In order to adapt to the possibly curved shapes of the outer skin and a course of its edges that may not be linear, the tube elements can be practically obtained through hydroforming. In order to achieve connecting the ends of the tube elements to one another, an end of one of the tube elements can be formed into a plug socket into which an end of another tube element formed as plug can be plugged. With a view to simple assembly of outer skin and frame it can be practical when the outer cross section of the plug socket is the same as that of a section of the tube following thereon, while the plug for plugging into the socket is tapered. In order to further simplify the assembly of the frame, a stop limiting the plug-in depth can be formed on one of the tube elements. Such a stop can in particular be a shoulder, which separates the plug from the rest of the tube carrying it.

The outer skin can be directly mounted onto the stiffening structure described above and be supported by the same; preferentially, it is separated from the same by an air gap in order to make possible yielding of the outer skin in the case of slight impacts without simultaneously straining the nub plate. In order to improve the durability of the outer skin and simultaneously protect the nub plate from being strained by slide impacts, a reinforcing component can be arranged between the outer skin and the nub plate which supports the outer skin over a base plate abutting the same and which in turn is stiffened by channels stamped into the base plate.

The reinforcing component can include multiple groups of stiffening channels. The channels of a first group can run congruently with the frame in order to facilitate the assembly of outer skin and reinforcing component on the frame. In particular, anchorage pins can be distributed along the channels of the first group for this purpose. Channels of a second group can run in vehicle longitudinal direction. In order to facilitate material separation when recycling the hood, the reinforcing component can practically consist of plastic like the outer skin.

BRIEF DESCRIPTION OF THE DRAWINGS

The present disclosure will hereinafter be described in conjunction with the following drawing figures, wherein like numerals denote like elements.

FIG. 4b shows a variant of the detail from FIG. 4a;

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
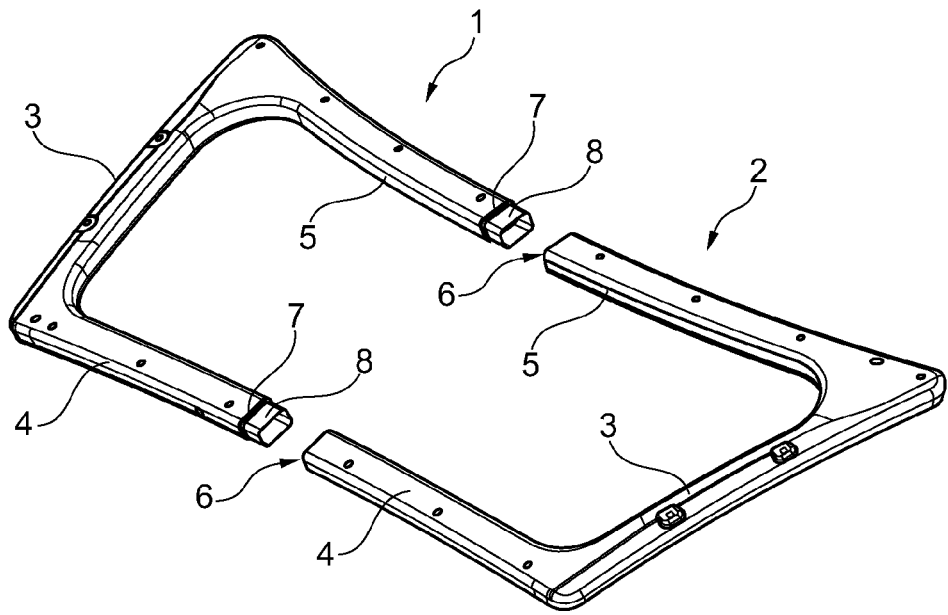
FIG. 1 is a perceptive view of tube elements of a frame of a hood according to the present disclosure.

FIG. 1 shows in a perspective view 2 C-shaped tube elements 1, 2. The irregular shape of the tube elements 1, 2 is adapted to the shape of a hood to be built up on these and obtained through heat forming of extruded tubes, preferentially aluminum tubes. Each of the two tube elements 1, 2 includes a lateral leg 3 and front and rear arms 4, 5 originating from the ends of the lateral leg 3. The arms 4, 5 of the right tube element 2 have a cross section which at least in the region of their free ends is substantially constant or only continuously variable and are open at their tips in order to form a plug socket 6. The arms 4, 5 of the tube element 1 from the lateral leg 3 to a shoulder 7 are each formed in mirror image with respect to the arms 4, 5 of the tube element 2. On the other side of the shoulder 7, a plug section 8 follows, the cross section of which is dimensioned in order to engage into the plug sockets 6 of the tube element 2. When the free ends of the arms 4, 5 of the tube element 2 abut the shoulders 7, the frame 9 formed by the tube elements 1, 2 has reached its intended dimensions and the tube elements 1, 2 can be fastened on one another for example through welding, soldering, brazing or gluing along the shoulders 6, in order to form the frame 9 shown in FIG. 2.

Figure 3:
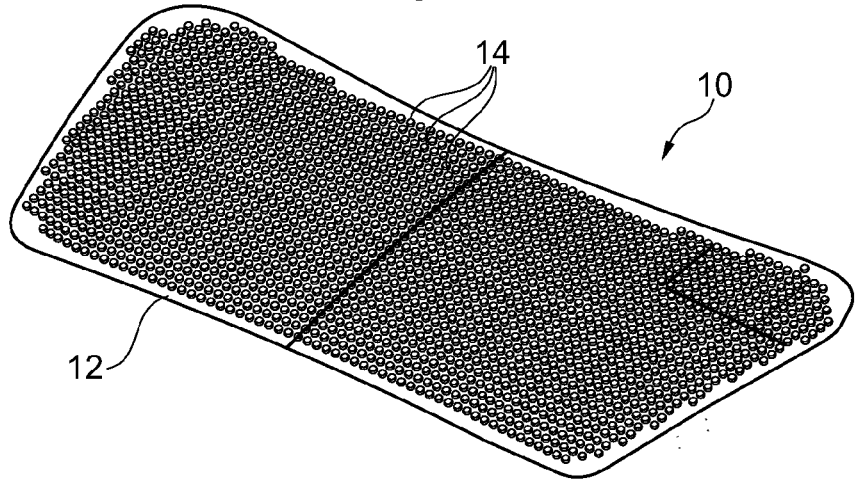
FIG. 3 shows a nub plate of the stiffening structure of the hood.
Figure 4:
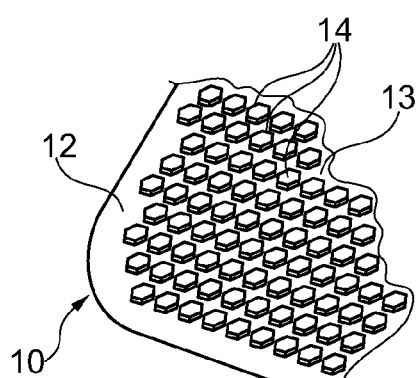
FIG. 4 is an enlarged detail of the nub plate.
Figure 4A:
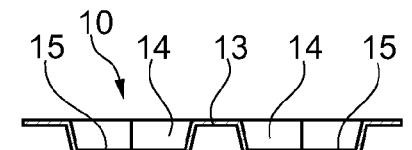
FIG. 4a shows a detail of a stiffening structure using the nub plate of FIG. 4 in longitudinal section.
Figure 4B:
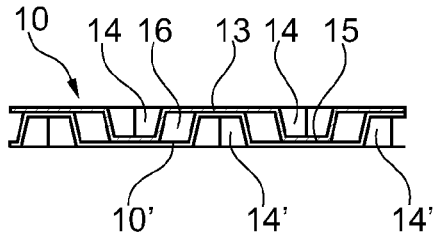

FIG. 3 shows a nub plate 10, which is provided as part of a stiffening structure for filling out a central opening 11 of the frame 9. Along an edge 12 copying the course of the frame 9 the nub plate 10 is flat; in a central region, as is evident in particular with the help of an enlarged detail view in FIG. 4, numerous nubs 14 are stamped out on a flat substrate 13 that is flush with the edge 12. The nubs 14 are arranged in a regular grid, the elementary cell of which in this case is square, i.e. each nub 14 has four next neighbors in directions that are orthogonal to one another. The nub plate 10 of the FIGS. 3 and 4 can, as shown in FIG. 4a as longitudinal section, be combined with a plate 10', which in each case is fastened to apexes 15 of the nubs 14, for example by gluing, be combined into a highly bending-resistance stiffening structure with low weight. The plate 10', as shown in FIG. 4a, can be flat, but in turn can also be a nub plate the nubs 14' of which, as shown in FIG. 4b, engage in intermediate spaces 16 between the nubs 14 of the plate 10 where they are fastened.

Figure 5:
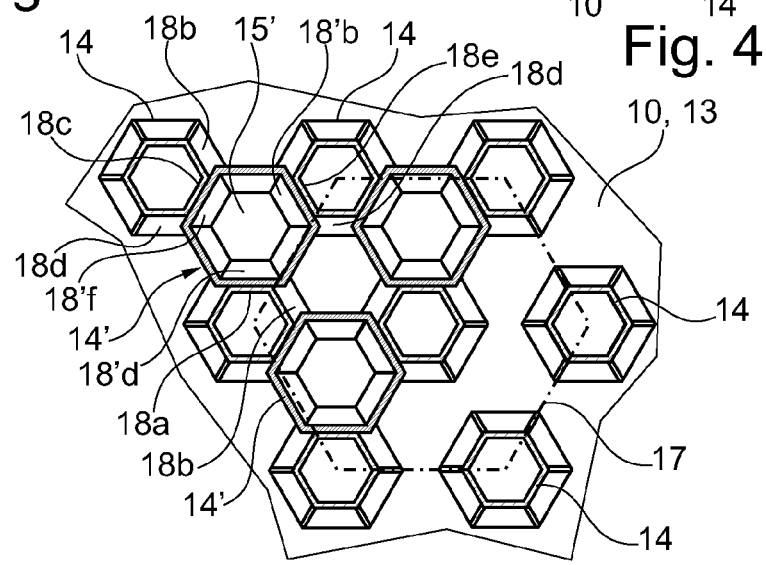
FIG. 5 shows a base area-parallel section through two nub plates joined into one another.

A further development of this principle is shown in FIG. 5 with the help of a section through a stiffening structure, the section plane of which extends parallel to the substrates 13, 13' of the two nub plates 10, 10' connected in it and in the process intersects the nubs 14, 14' of both plates 10, 10'. Only one, 13, of the substrates is visible since the other one extends above the section plane. The nubs 14, 14' in this case are each tapered from the substrate 13, 13' in the direction of their apexes 15', which on the one hand simplifies stamping the nubs and on the other hand also brings with it advantages regarding the bending stiffness in the configuration shown here. The grid, in which the nubs 14, 14' of the two nub plates are arranged, is hexagonal here, in each case with a knob nub in the middle and six next-adjacent nubs at the corners of the hexagonal elementary cell 17. The nubs 14' of the second nub plate 10' each engage between three nubs 14 of the nub plate 10 which are adjacent to one another so that of the six side walls 18' of the nub 14' every second, marked 18'b, 18'd, 18'f, abuts a side wall 18e, 18a and 18c respectively of one of the nubs 14 located opposite and the nub 14' fills out a gap between side walls of adjacent nubs 14 which in each case lie in a same plane such as for example the two side walls in each case marked 18b and 18d respectively in FIG. 5. These side walls 18b and 18d respectively can therefore not be moved towards one another when the stiffening structure is loaded in a direction that is perpendicular to the substrate 13 without simultaneously compressing the nub 14' between them at the same time. This imparts the stiffening structure a high load capacity even with small thickness of the nub plates 10, 10'.

Figure 6:
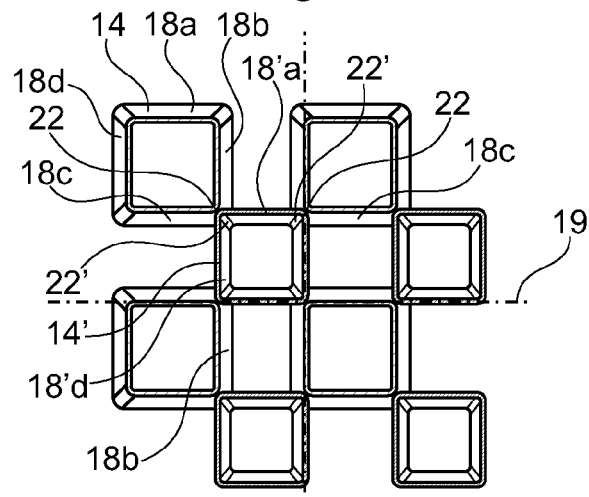
FIG. 6 shows a section analogous to FIG. 5 according to a variant.

FIG. 6 shows a modification of the principle explained with reference to FIG. 5, in which the nubs 14, 14' in each case have a square or rectangular base area. The side walls 18a-18d, 18'a-18'd of nubs 14, 14' of the different nub plates 10, 10' in this case do not abut one another but the edges 22, 22' formed between adjacent side walls of the nubs 14, 14' touch one another so that in each case a side wall, e.g. 18'a, 18'd of a nub 14' fills out a gap between two side walls 18c and 18b respectively of nubs which are aligned with one another and vice versa. Accordingly, the side walls 18, 18' mutually complement one another into orthogonally interception stiffening ribs 19.

Figure 7:
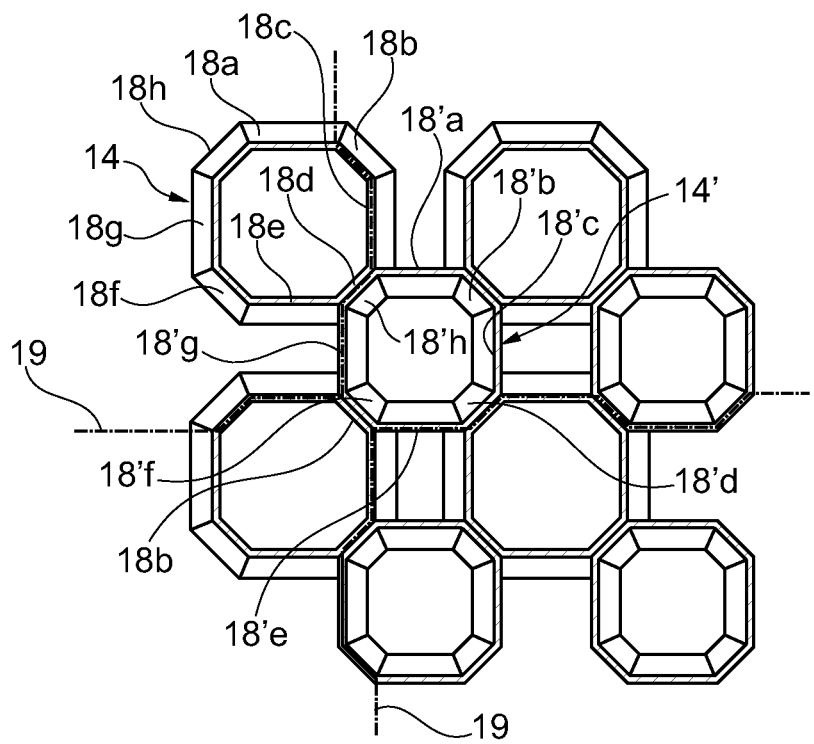
FIG. 7 shows a section analogous to FIG. 5 according to a second variant.

In the variant of FIG. 7, the nubs 14, 14' are octagonal in outline with side walls 18a-18h, 18'a-18'h. The ribs 19 formed by side walls of the nubs 14, 14' oriented in the same direction in this case no longer run linearly as in the case of FIG. 6 but are offset against one another by side walls such as for example 18d, 18'h and 18b, 18'f etc. which touch one another in each case, but it can be prevented in this way that the same oriented side walls as 18c, 18'g etc. under load slide passed one another, which in turn increases the bending stiffness.

Figure 2:
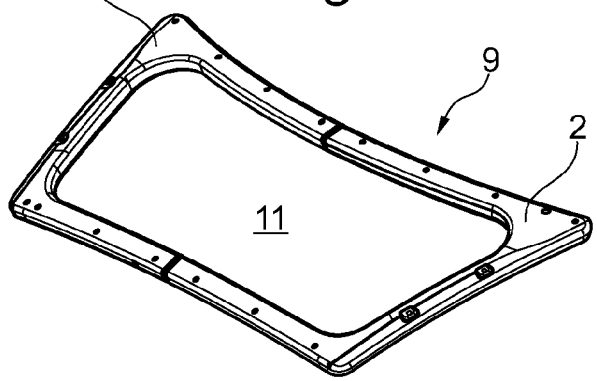
FIG. 2 shows the frame joined from the tube elements.
Figure 8:
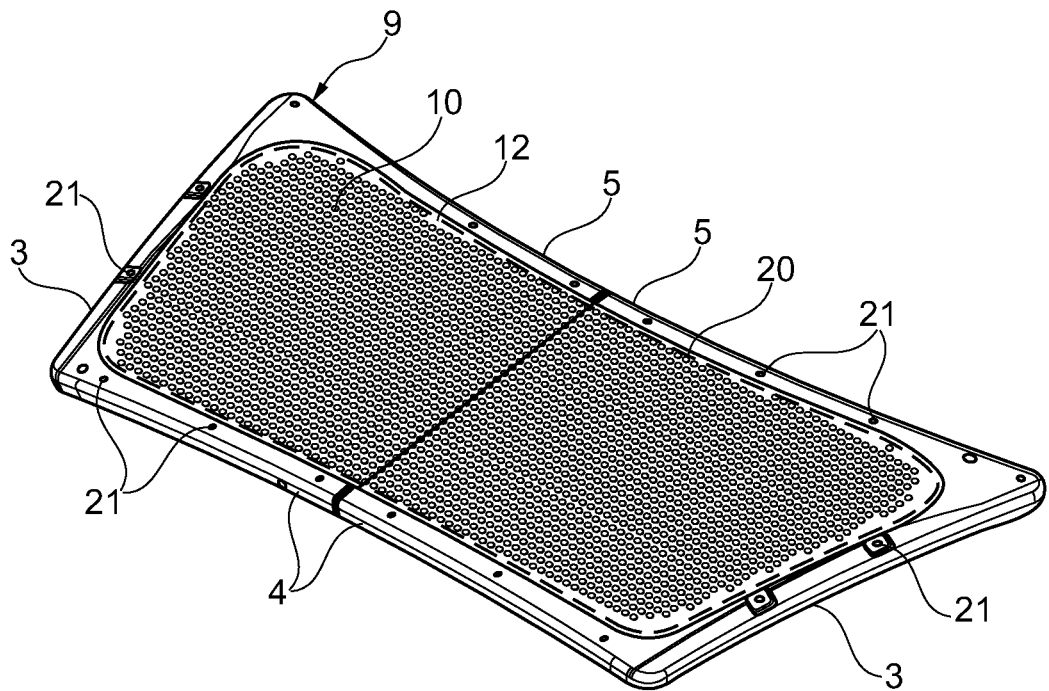
FIG. 8 shows the tube frame with joined-in nub plates.

FIG. 8 shows a complete stiffening structure with the frame 9 according to FIG. 2 and the nub plate 10 filling out the opening 11 of the frame 9 and being supported on the frame 9 along the flat edge 12. The second, flat or likewise nub-carrying plate is concealed under the nub plate 10 and therefore not visible in FIG. 8. The edge can be glued or welded to the frame 9 along a marking 20.

Figure 9:
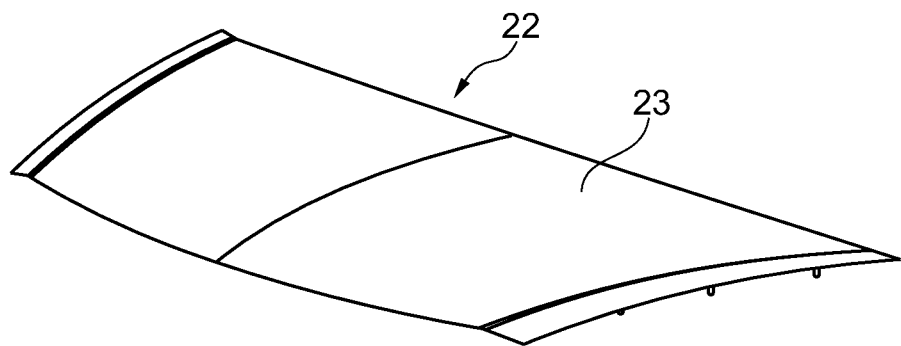
FIG. 9 is an outer view of an outer skin of the hood and of a reinforcing component connected therewith.
Figure 10:
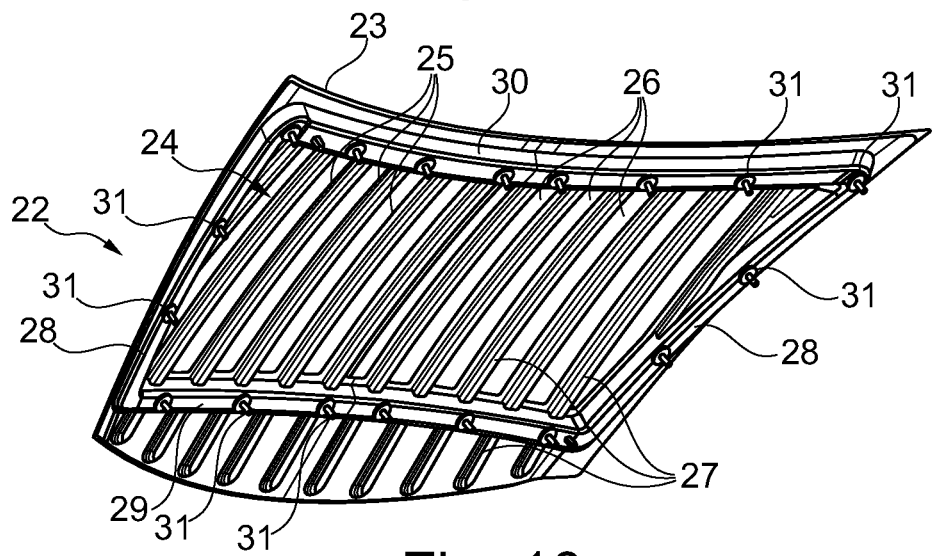
FIG. 10 is an inner view of the outer skin of the reinforcing component.

On the front and rear arms 4, 5 and the lateral legs 3 of the frame 9, fastening holes 21 are each distributed on the other side of the edge 12. The fastening holes 21 are provided in order to fasten an assembly 22 shown in FIGS. 9 and 10 thereon, thereby completing the hood.

In the assembly 22, an outer skin 23 made or plastic and a reinforcing component 24 made of plate or plastic are connected to one another. The reinforcing component 24 is deep-drawn from flat material and includes a base plate 25 abutting the outer skin 23, which is multiply subdivided and stiffened through channels of different orientation and depth. In the regions of the base plate 25 abutting the outer skin, openings 26 can be cut for weight reduction. Here, the channels can be combined into two groups. The channels 27 of the first group extend parallel to one another in vehicle longitudinal direction and are evenly distributed across the width of the hood. The second group includes two channels 28, which extend along the lateral edges of the reinforcing component 27, and transverse channels 29, 30 oriented in vehicle transverse direction, which connect the front and rear ends of the channels 30 into a structure that is congruent with the frame 9. The bases of the channels 28, 29, 30 are each locally reinforced in order to offer firm hold to screw pins 31, which are provided in order to engage in the frame 9 through the fastening holes 21.

Figure 11:
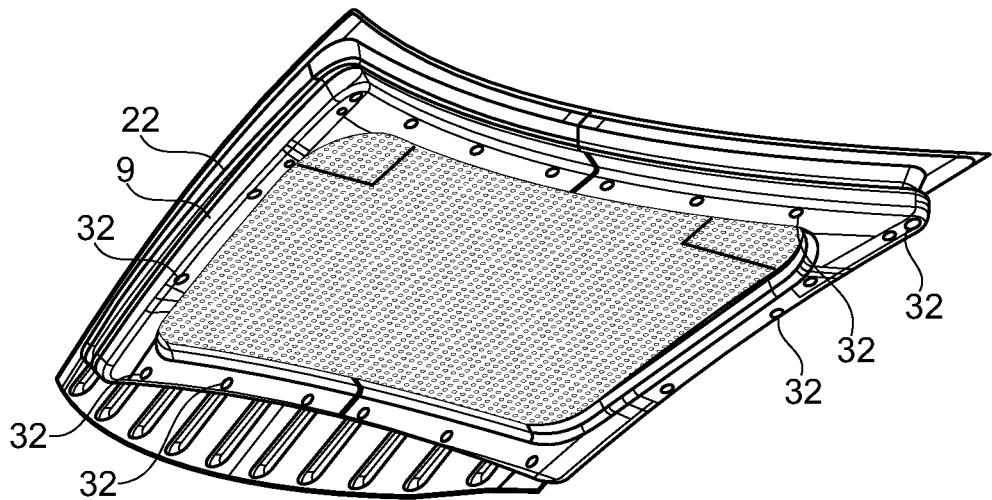
FIG. 11 is an inner view of the complete hood.

FIG. 11 shows the finished hood. The assembly 22 of outer skin 23 and reinforcing component 24 is mounted on the frame 9. On the bottom side of the frame 9, holes 32 are visible in each case through which a nut can be introduced in order to screw the same onto the screw pins 31 engaging in the tube elements of the frame 9.

Figure 12:
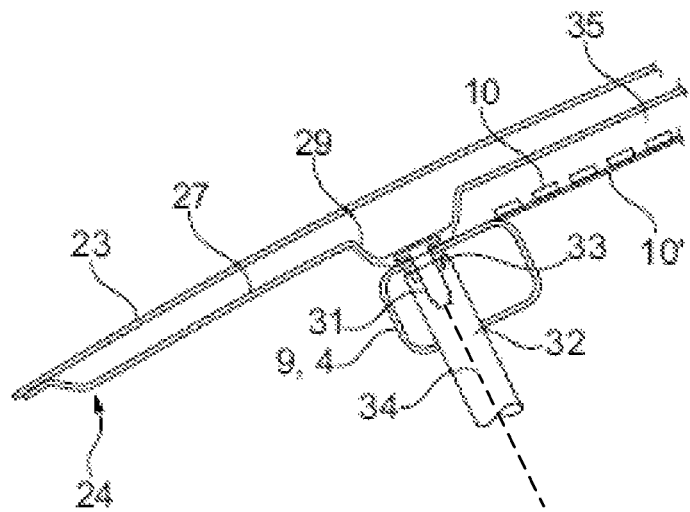
FIG. 12 shows a cross section through a from edge region of the hood.

FIG. 12 shows a schematic longitudinal section through a front edge region of the hood with a front arm 4 of the frame 9 and a screw pin 31 engaging in this arm 4. A fastening tool, which engages through a hole 32 in order to place a nut 33 onto the screw pin 31 is shown as dashed outline 34.

Between the assembly 22 and the nub plate 10, an air gap 35 is kept clear which makes it possible for the assembly 22 to remain resilient under slight loading without deforming the nub plate 10. The same becomes stiffeningly effective only in the case of a more intensive impact such as for example upon the impact of a pedestrian.

According to a simplified variant, the reinforcing component 24 may be replaced by the nub plates 10, 10', i.e. the outer skin 23 directly mounted onto the nub plates 10, 10'.

Figure 13:
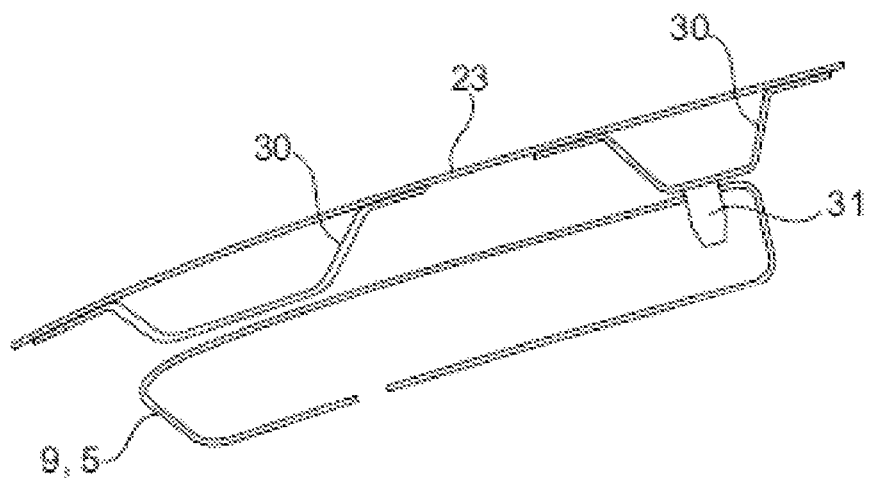
FIG. 13 shows a cross section through a rear edge region.

FIG. 13 shows a longitudinal section through a rear edge region of the hood that is analogous to FIG. 12. Instead of a single rear channel 30, two channels 30 which are parallel to one another extend over the rear arm 5 in this case. A screw pin 31 is shown on the rear one of the two channels 30.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A hood for a motor vehicle body comprising:
an outer skin; and
a stiffening structure covered by the outer skin, the stiffening structure including a first plate having a first substrate and a plurality of nubs extending from the first substrate, and a second plate coupled to at least one of the plurality of nubs of the first plate, wherein the stiffening structure further comprises a frame extending along a perimeter edge of the outer skin.

2. The hood according to claim 1, wherein the second plate comprises a second substrate and a plurality of nubs extending from the second substrate and disposed within intermediate spaces defined between the nubs of the first plate.

3. A hood for a motor vehicle body comprising:
an outer skin; and
a stiffening structure covered by the outer skin, the stiffening structure including a first plate having a first substrate and a plurality of nubs extending from the first substrate, and a second plate coupled to at least one of the plurality of nubs of the first plate,
wherein the second plate comprises a second substrate and a plurality of nubs extending from the second substrate and disposed within intermediate spaces defined between the nubs of the first plate, and
wherein the nubs of both the first and second plates have a polygonal cross section, wherein adjacent nubs of the first plate have side walls that are aligned with one another and a gap between the side walls which is filled by a nub of the second plate.

4. The hood according to claim 1, wherein the frame has an opening formed therein and the first and second plates fill out the opening in the frame.

5. The hood according to claim 1, wherein at least one of the first and second plates are supported on the frame.

6. The hood according to claim 1, wherein the frame comprises at least two tubular elements joined together.

7. The hood according to claim 6, wherein the tubular elements are hydro-formed tubes.

8. The hood according to claim 6, wherein an end of a first tubular element has a plug socket receiving an end of a second tubular element formed as plug.

9. The hood according to claim 8, wherein one of the first and second tubular elements comprises a stop limiting the plug-in depth of the second tubular element.

10. A hood for a motor vehicle body comprising:
an outer skin; and
a stiffening structure covered by the outer skin, the stiffening structure including a first plate having a first substrate and a plurality of nubs extending from the first substrate, and a second plate coupled to at least one of the plurality of nubs of the first plate, wherein the stiffening structure further comprises a reinforcing component between the outer skin and one of the first and second plates, the reinforcing component including a base plate abutting the outer skin and having a channel formed therein.

11. The hood according to claim 10, wherein the stiffening structure further comprises a frame extending along a perimeter edge of the outer skin such that the channel runs congruently with the frame.

12. The hood according to claim 11, further comprising anchorage pins are distributed along the channel for anchoring on the frame.

13. The hood according to any one of the claim 10, wherein the reinforcing component further comprises a second channel configured to run in a vehicle longitudinal direction.

14. The hood according to claim 10, wherein the reinforcing component comprises a plastic component.

15. The hood according to claim 1, wherein the outer skin and the first plate are separated by an air gap.

\* \* \* \* \*